United States Patent [19]
Kunz et al.

[11] Patent Number: 4,713,537

[45] Date of Patent: Dec. 15, 1987

[54] METHOD AND APPARATUS FOR THE FINE POSITION ADJUSTMENT OF A LASER BEAM

[75] Inventors: Rino E. Kunz, Steinmaur; Jürgen R. Junghans, Büren z. Hof; Jean A. Knus, Zurich; Urs Murbach, Neuenhof; Marcel F. Tuor, Rümlang, all of Switzerland

[73] Assignee: Gretag Aktiengesellschaft, Regensdorf, Switzerland

[21] Appl. No.: 897,259

[22] Filed: Aug. 18, 1986

[30] Foreign Application Priority Data

Aug. 23, 1985 [CH] Switzerland .................. 3644/85

[51] Int. Cl.⁴ ............................................. H01J 5/16
[52] U.S. Cl. ............................. 250/227; 219/121 LU
[58] Field of Search ............... 219/121 LU, 121 LV, 219/121 LW, 121 LX, 121 LZ; 250/227

[56] References Cited

U.S. PATENT DOCUMENTS

| | | | |
|---|---|---|---|
| 3,453,097 | 7/1969 | Hafner | 219/121 LU |
| 3,485,996 | 12/1969 | Chiuo et al. | 219/121 LC |
| 4,140,544 | 2/1979 | Sill | 250/227 |
| 4,156,124 | 5/1979 | Macken et al. | 219/121 LU |
| 4,328,410 | 5/1982 | Slivinsky et al. | 219/121 LW |
| 4,539,481 | 9/1985 | Troukens et al. | 250/557 |

*Primary Examiner*—David C. Nelms
*Assistant Examiner*—Chung K. Seo
*Attorney, Agent, or Firm*—Burns, Doane, Swecker & Mathis

[57] ABSTRACT

On an essentially non-absorbing plate located in the focal plane of a laser beam to be adjusted, a plurality of marks is arranged in a definite pattern. The marks deflect the laser light incident upon them by refraction, scattering, diffraction or otherwise, and direct the deflected light onto one or several laser detectors. The detectors convert the light received into corresponding electrical signals which may used for the fine adjustment of the laser beam by an evaluating electronic device.

23 Claims, 31 Drawing Figures

METHOD AND APPARATUS FOR THE FINE POSITION ADJUSTMENT OF A LASER BEAM

BACKGROUND OF THE INVENTION

The present invention relates to a method and apparatus for the fine adjustment of a focused laser beam, in particular for the calibration of the beam deflection geometry in a laser machining apparatus.

The setting and fine adjustment of the beam deflection geometry in laser machining is a relatively laborious and expensive operation. For this purpose, a test pattern is usually cut into a workpiece with a laser beam, the pattern measured, the parameter setting corrected correspondingly and the entire procedure repeated, possibly several times, until the test pattern cut is in sufficiently accurate agreement with the ideal pattern.

In contrast, to adjust the deflection geometry in electronic scanning systems, among others, the following procedure is carried out: placing a defined calibrating pattern into the image plane, "scanning" the individual points of this pattern, the coordinates of which are known, with the projected scanning beam and correlating the necessary deflection data of the beam with the relevant coordinates. This method makes possible the automatic calibration of the system.

Such automatic calibration or fine adjustment procedure would be advantageous and desirable for laser processing machines, but has not been developed heretofore for the obvious reason that in the case of laser machines the material being worked is in the image or focal plane and consequently no calibration pattern can be applied to it. Furthermore, any appreciable reduction or attenuation of the laser intensity during calibration is not appropriate, as the beam would then no longer be representative of the subsequent actual operating conditions. A reduced beam intensity may alter the beam parameters and errors in the deflection geometry may be introduced by thermal effects. It is therefore important to be able to perform the calibration under conditions approximating the actual operating conditions as nearly as possible.

Conventional methods, which use cracks, holes, cutting blades or the like as test pattern components are entirely unsuitable because of the unavoidable working of the material under the full beam intensity.

The following patents are representative of the state of the art: U.S. Pat. No. 4,539,481 (EP-A No. 080 651), U.S. Pat. No. 3,485,996 (FR-A No. 1 551 347) and German Pat. DE-A-No. 2,559,925.

U.S. Pat. No. 4,539,481 discloses a method for adjusting the reference system of a laser processing device. In the method, the continuous-wave laser beam passes over the edge of the workpiece during each searching motion and the position of the workpiece is thereby determined relative to the reference system, which is then corrected accordingly. This method therefore positions the workpiece but does not correct nor adjust the beam geometry and parameters.

U.S. Pat. No. 3,485,996 discloses a laser welding apparatus, in which the workpiece is scanned by an auxiliary light source. Whenever the location on the workpiece of the weld to be carried out is detected by this scanning process, the laser beam is triggered.

German Pat. DE No. 2,559,925 discloses an apparatus for the centering adjustment of a laser beam on the optical axis of a microscope objective lens. A separate adjusting laser and a graticule that is centered with respect to the focusing optics are provided to center the laser beam on the optical axis. The deflection of the adjusting laser beam relative to the graticule is observed.

OBJECTS AND BRIEF SUMMARY OF THE INVENTION

It is the primary object of the present invention to provide a method and apparatus for the simple automatable fine adjustment or calibration of a focused laser beam at full beam intensity. The foregoing object is attained by the apparatus and the method according to the invention as set out more fully in the claims.

According to a fundamental principle of the invention, a substrate which essentially does not absorb the laser beam is placed in the focal plane of the laser beam and marks, which again are only slightly absorbent of the laser light, are applied to the substrate, said marks deflecting a fraction of the incident laser light, which can than be captured by suitable sensors. In this manner, there is no undesirable working of the material even with the full intensity of the laser beam and calibration may be effected under actual operating conditions.

The apparatus according to the invention is intended primarily and firstly for the adjustment of beam deflection geometry. It may, however, also be used for focusing, assessing beam quality, etc.

BRIEF DESCRIPTION OF THE DRAWINGS

The foregoing objects and advantages of the present invention will become more apparent to one skilled in the art to which the invention pertains from the following detailed description read in conjunction with the drawings in which.

DETAILED DESCRIPTION

Figure 1:
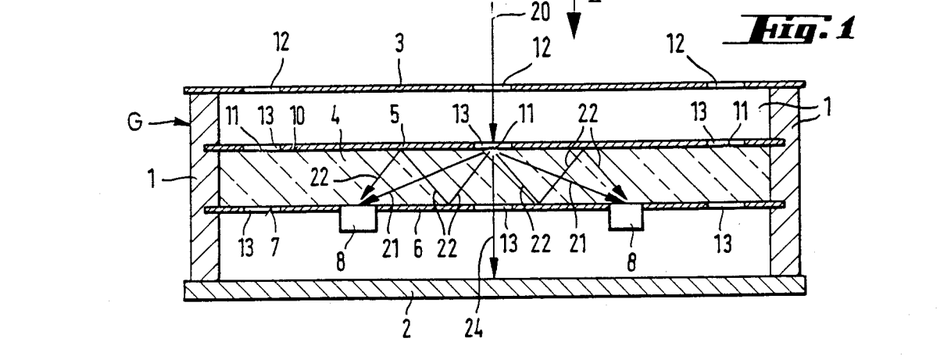
FIG. 1 shows a section on the line I—I of FIG. 2, through an example of an embodiment of an apparatus according to the invention.
Figure 2:
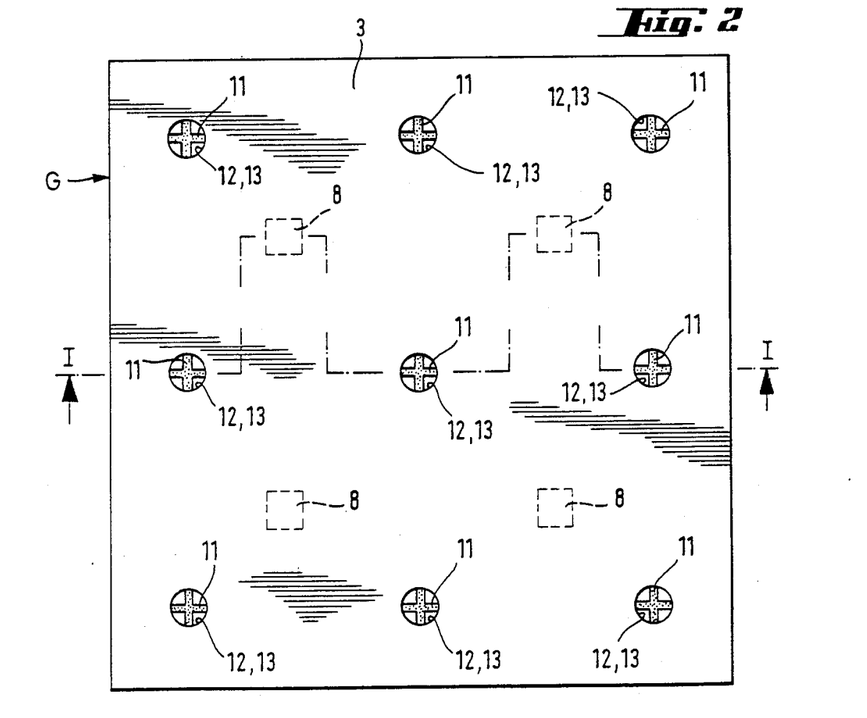
FIG. 2 shows a top view of the apparatus of FIG. 1.

According to FIG. 1, a preferred embodiment of the apparatus comprises a rectangular housing G with four side walls 1, a bottom 2 and a cover 3. A plane-parallel, essentially transparent plate 4 is arranged in the housing approximately in the center between the bottom and the cover and parallel to them. Perforated masks 5 and 6 are located on either side of the plate and on the bottom side 7 of the plate 4 four laser detectors (photoelectric transducers) 8 are mounted. The detectors are connected by means of signal conductors, not shown, with an electronic circuit 9 (FIG. 4) for the evaluation of the signals generated by the detectors. On the top side 10 of the transparent plate 4 light scattering marks 11, shown here in FIG. 2 in the form of a cross, are arranged. The cover 3 is in the form of an aperture, with the aperture holes 12 of the cover and the holes 13 of the two perforated masks 5 and 6 being located in the direction of propagation of the incident laser beam always over or below a mark 11. In this manner only the immediate vicinity of each mark 11 may be exposed to the laser light.

In actual practice, the apparatus is placed into the beam path of the laser processing machine in a manner such that the surface 10 carrying the marks 11 of the transparent plate 4 is located in the focal plane of the laser beam 20. The cover 3 of the apparatus acting as an aperture diaphragm is thus located far enough above the focal plane so that the material of the cover 3 is not worked by the beam.

To carry out the adjustment process, the laser beam 20 is guided over the individual marks 11. Where there are no marks 11, i.e. within the vicinity of the marks 11 defined by the holes 12 and 13 in the aperture diaphragm 3 and the masks 5 and 6, the laser beam passes without hindrance through the transparent plate 4 and impacts the bottom 2 of the housing G, which is in the form of and acts as an absorber (beam sink). Since this bottom 2 is spaced apart widely from the focal plane, again the material of the bottom 2 is not worked, but merely heated by the beam. This heating is not substantial and may be controlled simply by appropriate cooling measures, if necessary.

When the laser beam 20 impacts a mark 11, a small fraction of the incident light is deflected; the deflected light travels directly (beam 21 in FIG. 1) or by means of multiple reflections from the bottom and top surfaces 7 and 10 of the plate 4 (beams 22 in FIG. 1) to the laser detectors 8, which then emit appropriate electric signals to the evaluating electronic device 9. The amount of light deflected by the marks 11 is small enough so that the laser detectors 8 are not damaged.

The calibration of the laser beam deflection geometry may now be effected automatically in a conventional manner, similar to that used in electronic scanning systems, by the scanning of the individual marks 11 and the correlation of the necessary deflection data with the known positions of the marks. Although this process is rather complex in view of the numerous, partially interdependent parameters involved, it is in itself part of the state of the art.

Figure 3:
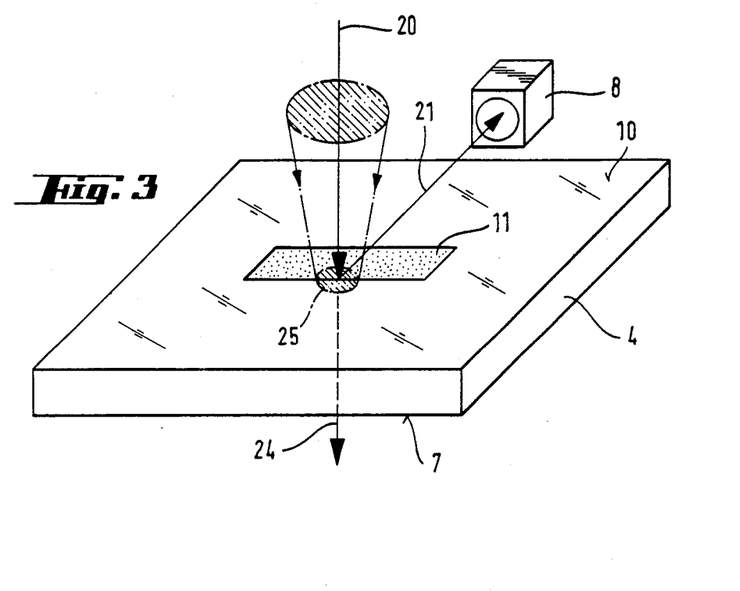
FIG. 3 shows a detail diagram to illustrate the operating principle of the invention.

FIG. 3 again shows a fundamental principle upon which the invention is based. The focused laser beam 20 impacts the top surface 10 of the transparent substrate 4 which here is in the form of a plate located in the focal plane and produces a focal spot with a relatively small diameter. Part of the laser beam 20 impacts the mark 11, which is shown in the figure in the form of a bar. The mark in turn deflects a fraction of the light impacting it onto the laser detector 8, which then generates a corresponding electrical signal. The deflected part of the light is designated by 21 and the portion passing through the substrate without deflection by 24.

The substrate and the marks may have various configurations and not depart from the spirit of the claimed invention. It is essential for the substrate to have the lowest possible absorption with regard to the laser light used. It must therefore be transparent or mirror reflecting. For practical reasons a transparent substrate is more suitable. The marks again must be appreciably non-absorbent, as otherwise an undesirable working of the marks' material by the focused laser beam would be unavoidable. The marks must in some manner deflect a portion of the light impacting them, so that it may be received by the laser detectors. This deflection may be effected in different fashions, for example by scattering, refraction, diffraction or directed reflection. Scattering is preferred for practical reasons.

The number and configuration of the marks and their placement depends on the mode and accuracy of the calibration to be performed. For many cases for example a layout according to FIG. 2 with nine marks is suitable. In principle, a single laser detector is sufficient, but preferably several detectors are provided. They are preferably arranged approximately according to FIG. 2, so that all of the detectors will have approximately the same sensitivity for all of the marks. In other words, if the output electrical signals of all of the detectors are summed, the sum signal when the laser beam impacts on one mark should be equal to the sum signal when the beam impacts any other mark.

Figure 4:
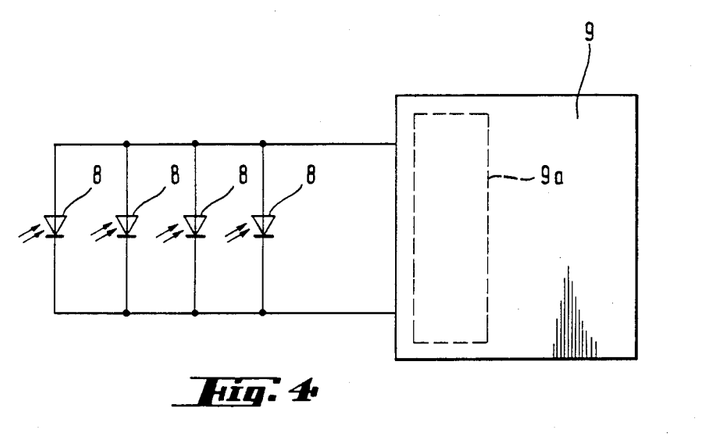
FIG. 4 shows a fundamental circuit diagram of the electronic part of the apparatus; and, FIGS. 5a, 5b, 5c, 6a, 6b, 6c, 7a, 7b, 7c, 8a, 8b, 8c, 8d, 9a, 9b, 10a, 10b, 11a, 11b, 11c, 12, 13a, 13b, 13c, 13d, 13e and 13f show details of various embodiments of the present invention.

FIG. 4 shows the electric part of the apparatus. The four laser detectors 8 (for example silicon photodiodes preceded by optical filters) are connected in parallel and the parallel combination is connected to an evaluating electronic circuit 9, which initially processes (part 9a) the detector signals and then evaluates them for the calibration of the laser processing machine. Usually, the evaluating circuit is a component of the electronic controls of the entire laser processing machine although the initial processing part 9a for performing the immediate processing of the signals may be separate from the usual evaluating circuit. In this connection, initial processing part 9a may evaluate the detector signals (e.g. the sum) in relation to a predetermined expected value, and provide a signal (e.g. the difference) which can be used to display and/or control the beam deflection geometry in a usual feedback control system.

Figure 5A:
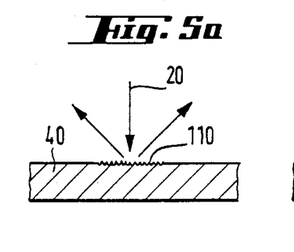
Figure 5B:
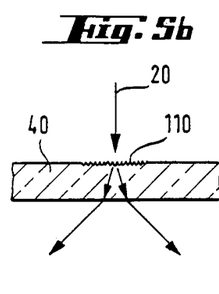
Figure 5C:
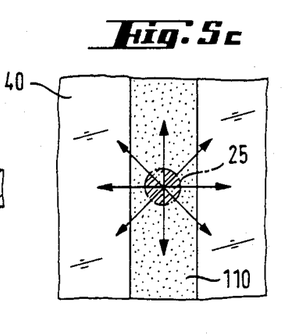
Figure 6A:
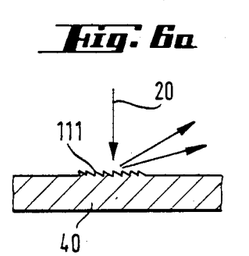
Figure 6B:
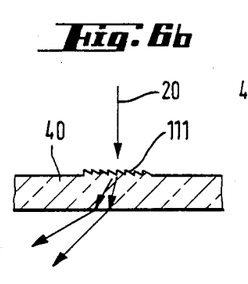
Figure 6C:
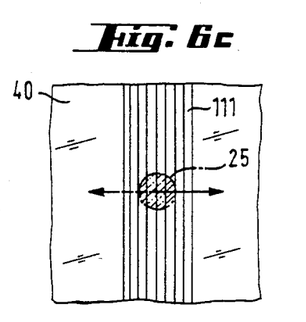
Figure 7A:
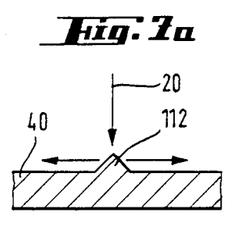
Figure 7B:
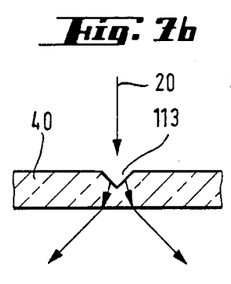
Figure 7C:
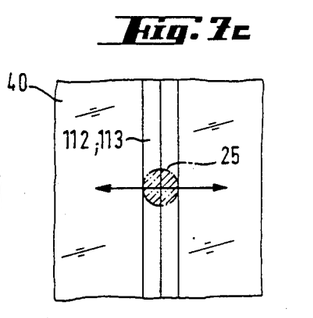

FIGS. 5a–5c, 6a–6c, and 7a–7c show different possible embodiments of the marks and the substrate. In FIGS. 5a, 6a and 7a the substrate 40 is essentially reflecting; in FIGS. 5b, 6b and 7b the substrate 40 is essentially transparent. FIGS. 5c, 6c, and 7c show top views of the substrate with the different possible marks respectively, and the direction of the light deflected therefrom. In FIGS. 5a and 5b, the marks 110 are comprised of a local roughening of the substrate, obtained for example by etching, and have a scatter effect. In FIGS. 6a and 6b the marks are comprised of a ribbing (grid structure) 111 that effects the deflection of the light. In FIGS. 7a and 7b the marks are comprised of a raised facet 112 and a concave facet 113 that effect a directed mirroring or diffraction and thus deflection of the light, as shown in FIG. 7c.

Figure 8A:
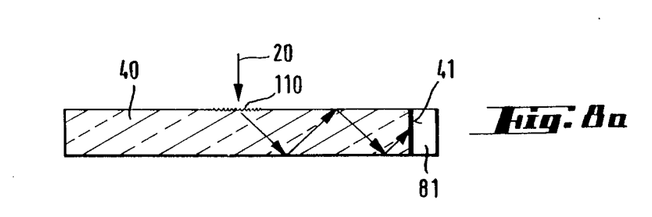
Figure 8B:
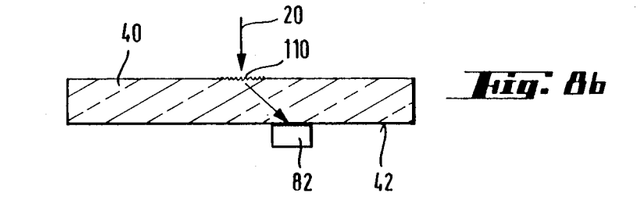
Figure 8C:
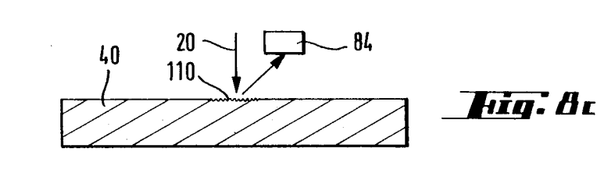
Figure 8D:
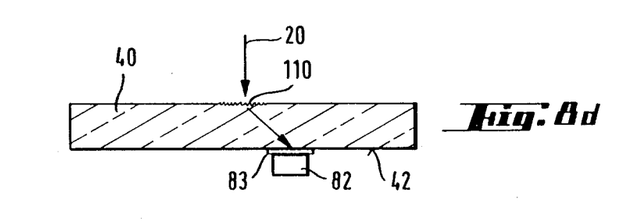

FIGS. 8a–8d display different possible layouts of the laser detectors. In FIG. 8a the detector 81 is located on one frontal side 41 of the essentially transparent substrate 40. The light scattered by the mark 110 reaches the detector by multiple internal reflection from the substrate surfaces. In FIG. 8b the detector 82 is placed directly on the bottom side 42 of the transparent substrate 40. The same positioning is true for FIG. 8d, but an optical filter disk 83 tuned to the wavelength of the laser light used is inserted between the detector and the substrate. In FIG. 8c the substrate 40 is essentially reflecting, so the detector 84 is located above the substrate.

Figure 9A:
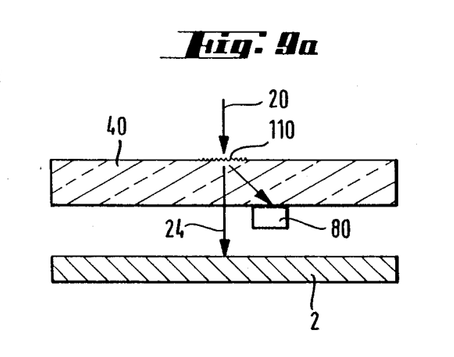
Figure 9B:
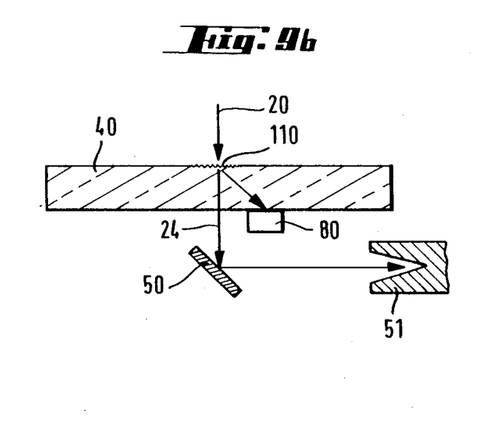

FIGS. 9a and 9b shows two possible embodiments of a beam sink for absorbing the laser light not deflected onto the laser detectors 80. In FIG. 9a the light passing through the substrate 40 impacts an optionally cooled absorber plate 2 similar to the embodiment shown in FIG. 1. In FIG. 9b the light is deflected by means of a mirror 50 and directed onto its own beam sink 51. Obviously, further variants are conceivable and possible within the spirit of the claimed invention.

Figure 10A:
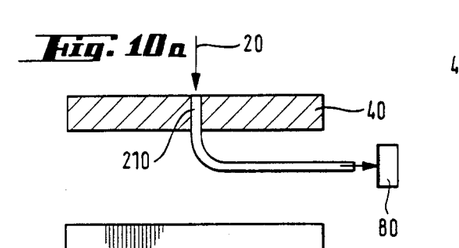
Figure 10B:
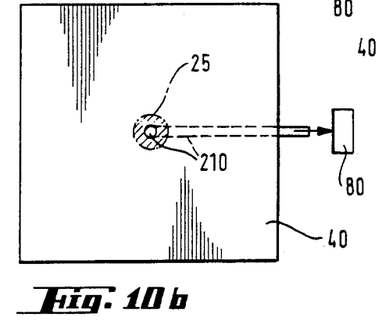
Figure 11A:
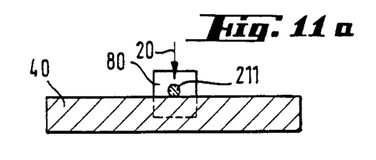
Figure 11B:
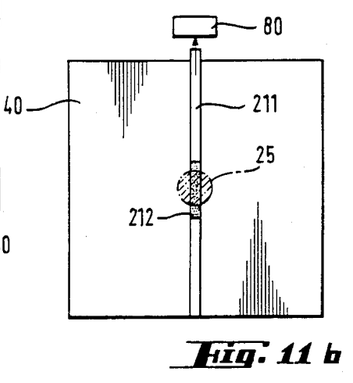
Figure 11C:
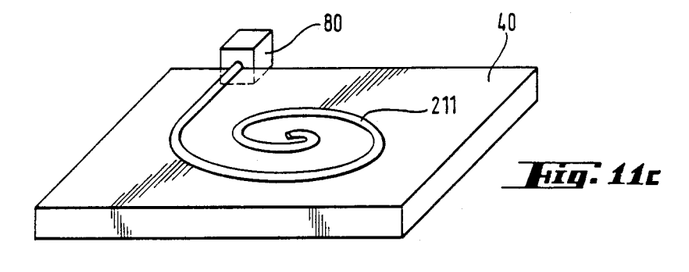
Figure 12:
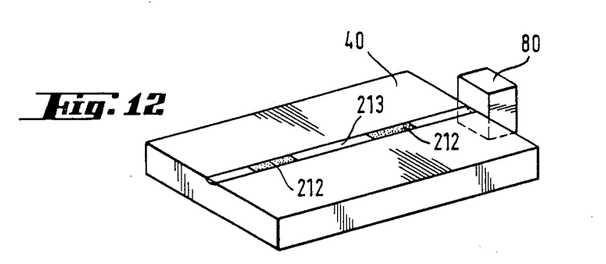
Figure 13A:
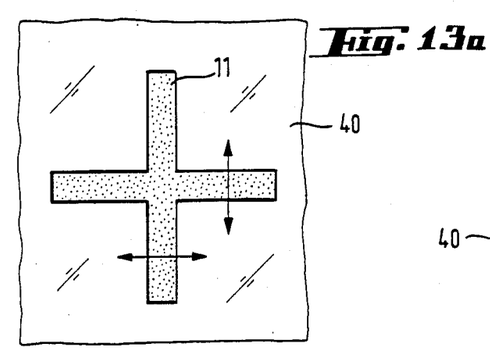
Figure 13B:
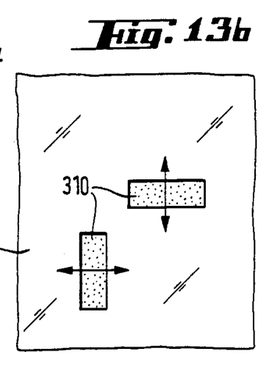
Figure 13C:
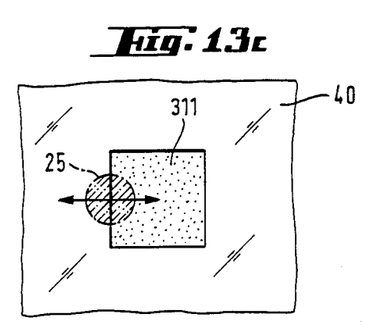
Figure 13D:
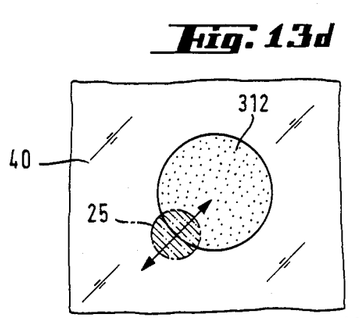
Figure 13E:
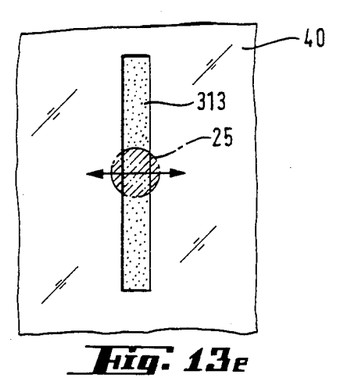
Figure 13F:
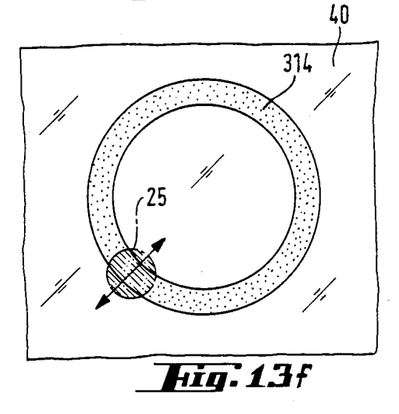

FIGS. 10a, 10b, 11a, 11b, 11c and 12 show additional possibilities of practical embodiments of marks having properties according to the present invention. In FIGS. 10a and 10b, one end of a light conductor 210 is set into the substrate 40 that can be either transparent or reflecting. The other end of the light conductor 210 is directed to laser detector 80. FIG. 10b shows the dimensional relationship of the diameter of the light conductor 210 and the diameter of the focal spot 25 of the laser beam. In FIGS. 11a–11c a light conductor 211 rests on the substrate 40. The surface of the conductor 211 is locally roughened. If a laser beam impacts this roughened zone 212, light penetrates into the conductor 211 and is passed to the laser detector 80. In the embodiment shown in FIG. 11c, the light conductor 211 resting on the substrate 40 is not linear but is in the form of a spiral. In this manner, the entire substrate surface may be covered by means of a single light conductor having many separate roughened zones. FIG. 12 shows a light conductor 213 produced directly in the substrate material, for example by a diffusion process that alters the refractive index of the substrate material.

FIGS. 13a–13f show different shapes of the marks 11 and 310–314. It is important that the marks have edges as sharp as possible. It is further advantageous to make the marks large enough so that the entire focal spot may rest on the surface of the mark. The maximum detector signal then does not depend on the diameter of the focal spot which has certain advantages for the technology of the measurements (e.g. fixed detector dynamics). For example, for a focal spot diameter of 50–200 units, mark widths of approximately 800 units were found to be satisfactory. Furthermore, broader marks are easier to etch with sharp borders than extremely thin marks.

The thickness of the transparent substrate depends on the laser detector layout, the scatter characteristics of the marks and the optimum data of the impacting laser beam. A thickness value of approximately 8–12 mm is, for example, suitable. The perforated masks 5 and 6 and the aperture diaphragm 3 shown in FIG. 1 provide a shield against parasitic scattered light.

The apparatus according to the present invention may further be embodied by means of the technologies of the field of integrated optics, wherein the substrate, the marks and the laser detectors would be produced as a single integrated optical circuit.

It will be appreciated by those of ordinary skill in the art that the present invention can be embodied in other specific forms without departing from the spirit or the essential characteristics thereof. The presently disclosed embodiments are therefore considered in all respects to be illustrative and not restrictive. The scope of the invention is illustrated by the appended claims rather than the foregoing description and all changes that come within the meaning and range of equivalents thereof are intended to be embraced therein.

What is claimed is:

1. An apparatus for evaluating the fine adjustment of a laser beam emitted by a laser and focused to a focal plane particularly the calibration of the beam deflection geometry, comprising:
    a substrate for placement in the focal plane of the laser beam, the substrate being essentially non-absorbent of the laser light of said beam, said substrate having a plurality of marks arranged for scattering, refracting, diffracting or otherwise deflecting the laser light; and
    a photoelectric device for the selective reception of the laser light scattered, refracted, diffracted or otherwise deflected, and for conversion of the received light into electrical signals.

2. An apparatus according to claim 1, further comprising an electronic device for evaluating the electric signals, wherein said electronic device receives the signals from the photoelectric device.

3. An apparatus according to claim 1, wherein the substrate is essentially transparent to the laser light and is flat.

4. An apparatus according to claim 1, wherein the substrate is essentially reflective of said laser beam and is flat.

5. An apparatus according to claim 1, further comprising an aperture diaphragm spaced apart from the substrate, disposed between the substrate and the laser, for essentially blocking all of the laser light not impacting the immediate vicinity of the marks.

6. Apparatus according to claim 1, further comprising a beam sink for dissipating the laser light reflected or transmitted in the vicinity of the marks by the substrate.

7. An apparatus according to claim 1, wherein said marks have edges which are abrupt and have at least one dimension in a direction parallel to the focal plane which is larger than a corresponding dimension of the laser beam.

8. An apparatus according to claim 1, wherein said photoelectric device includes at least one laser detector for receiving the laser light scattered, refracted, diffracted or otherwise deflected by said marks.

9. An apparatus according to claim 1, wherein said photoelectric device includes at least one laser detector for receiving said light deflected by said marks and at least one optical filter for filtering said light disposed between said substrate and said at least one detector.

10. An apparatus according to claim 1, further comprising a first perforated mask and a second perforated mask wherein said first mask has openings corresponding to the position of the marks on the substrate, said first mask being located adjacent to said substrate and disposed between said substrate and the laser, and wherein said second mask has openings corresponding to the positions of the marks on the substrate, said second mask being located adjacent to said substrate, said substrate being disposed between said second mask and the laser.

11. An apparatus according to claim 4, wherein the marks scatter the light of said laser beams.

12. An apparatus according to claim 3, wherein the marks scatter the light of said laser beam.

13. An apparatus according to claim 11, further comprising a perforated mask, wherein said mask has openings in an area of the mask corresponding to the marks on the substrate, said mask being located adjacent to said substrate and being disposed between said substrate and the laser.

14. An apparatus according to claim 10, wherein the first perforated mask, the substrate, and the second perforated mask are arranged so that laser light not deflected by the marks passes through said first mask, said substrate, and said second mask.

15. An apparatus according to claim 14, wherein said photoelectric device includes a plurality of laser detectors arranged so that when the laser beam impacts one of said marks, all of said detectors receive an amount of light deflected by the mark impacted substantially equal to the amount of light received by all of the detectors when the laser beam impacts any other mark.

16. An apparatus according to claim 10, further comprising an aperture diaphragm for essentially blocking all of the laser light not impacting the immediate vicinity of the marks, and a beam sink for dissipating the light transmitted by the substrate in the vicinity of the marks.

17. An apparatus according to claim 13, wherein said photoelectric device includes a plurality of laser detectors arranged so that when the laser beam impacts one of said marks, all of said detectors receive an amount of light deflected by the mark impacted substantially equal to the amount of light received by all of the detectors when the laser beam impacts any other mark.

18. An apparatus according to claim 13, further comprising an aperture diaphragm for essentially blocking all of the laser light not impacting the immediate vicinity of the marks, and a beam sink for dissipating the light not scattered by the marks.

19. An apparatus according to claim 16, wherein the aperture diaphragm, the first perforated mask, the substrate, the second perforated mask, and the beam sink are disposed to form an essentially closed housing.

20. An apparatus according to claim 18, wherein the aperture diaphragm, perforated mask, substrate, and beam sink are disposed to form an essentially closed housing.

21. A method for evaluating the fine adjustment of a laser beam emitted by a laser and focussed to a focal plane, particularly for calibrating the beam deflection geometry, comprising the steps of:
   arranging an essentially non-absorbing substrate in the focal plane of the laser beam, said substrate having a plurality of marks for scattering, refracting, diffracting or otherwise deflecting the laser light;
   deflecting a portion of the laser light which impacts on said marks;
   receiving the light deflected in at least one laser detector, said at least one detector generating an electrical signal in response thereto.

22. A method according to claim 21, further comprising the step of:
   evaluating the electrical signal generated by said at least one detector in an electronic device.

23. A method according to claim 22, further comprising the step of:
   adjusting the beam deflection geometry of the laser beam in response to the evaluation of said electrical signal in said electronic device.

* * * * *